10 Sheets—Sheet 1.

N. B. FASSETT.
Grain-Binder.

No. 202,803. Patented April 23, 1878.

WITNESSES:
Saml. S. Boyd
Paul Bakewell

INVENTOR,
Nelson B. Fassett,
by Chas. D. Moody.
his atty:

10 Sheets—Sheet 2.

N. B. FASSETT.
Grain-Binder.

No. 202,803.     Patented April 23, 1878.

WITNESSES.     INVENTOR.

Saml. S. Boyd     Nelson B. Fassett,
Paul Bakewell     by Chas. D. Moody
                       his atty.

10 Sheets—Sheet 3.

N. B. FASSETT.
Grain-Binder.

No. 202,803. Patented April 23, 1878.

WITNESSES:
Saml. S. Boyd
Paul Bakewell

INVENTOR:
Nelson B. Fassett,
by Chas. D. Moody,
his atty.

N. PETERS, PHOTO-LITHOGRAPHER, WASHINGTON, D. C.

10 Sheets—Sheet 4.
N. B. FASSETT.
Grain-Binder.
No. 202,803. Patented April 23, 1878.
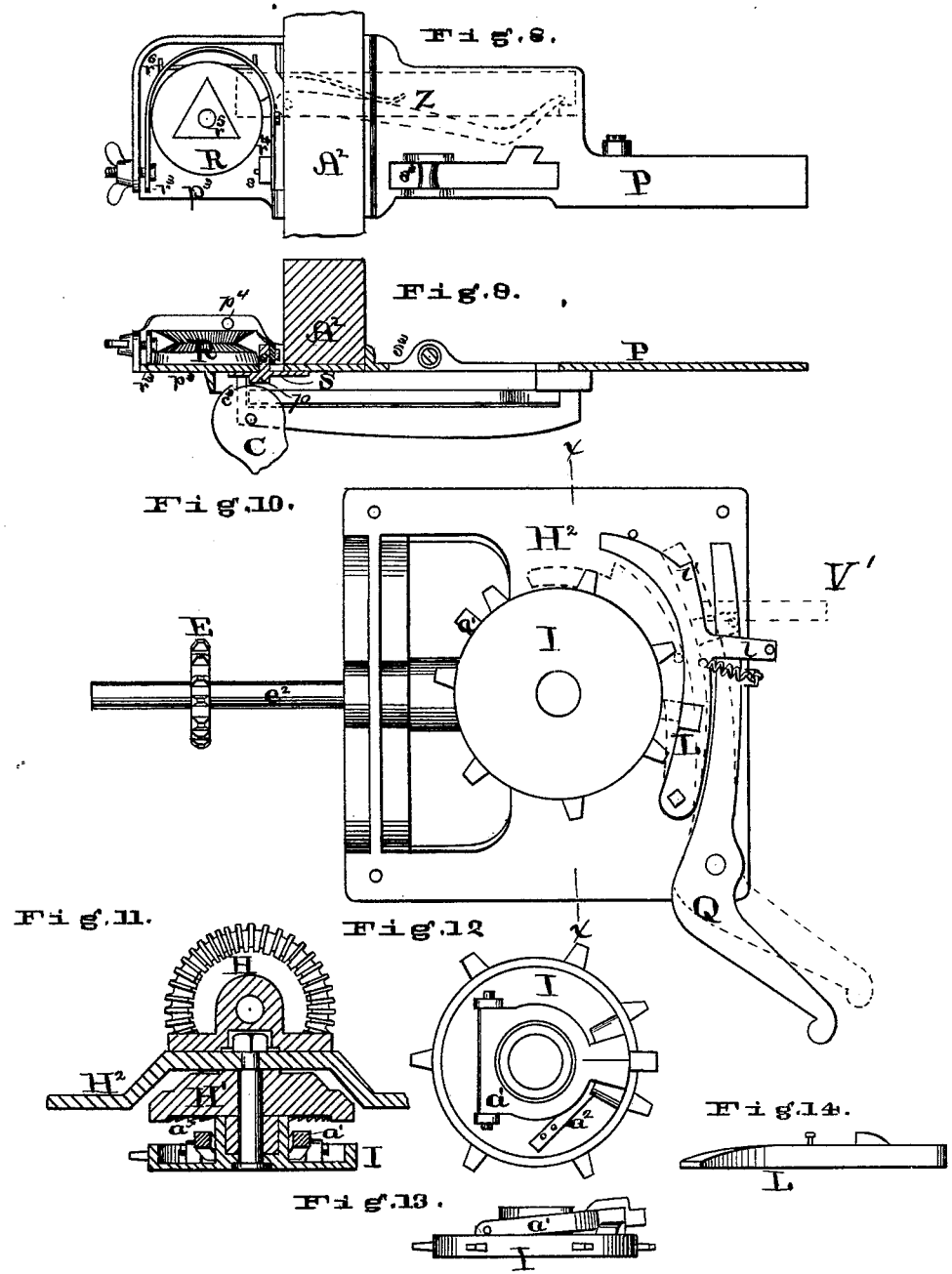
WITNESSES:
Samue S. Boyd
Paul Bakewell
INVENTOR.
Nelson B. Fassett,
by Chas. D. Moody
his atty.

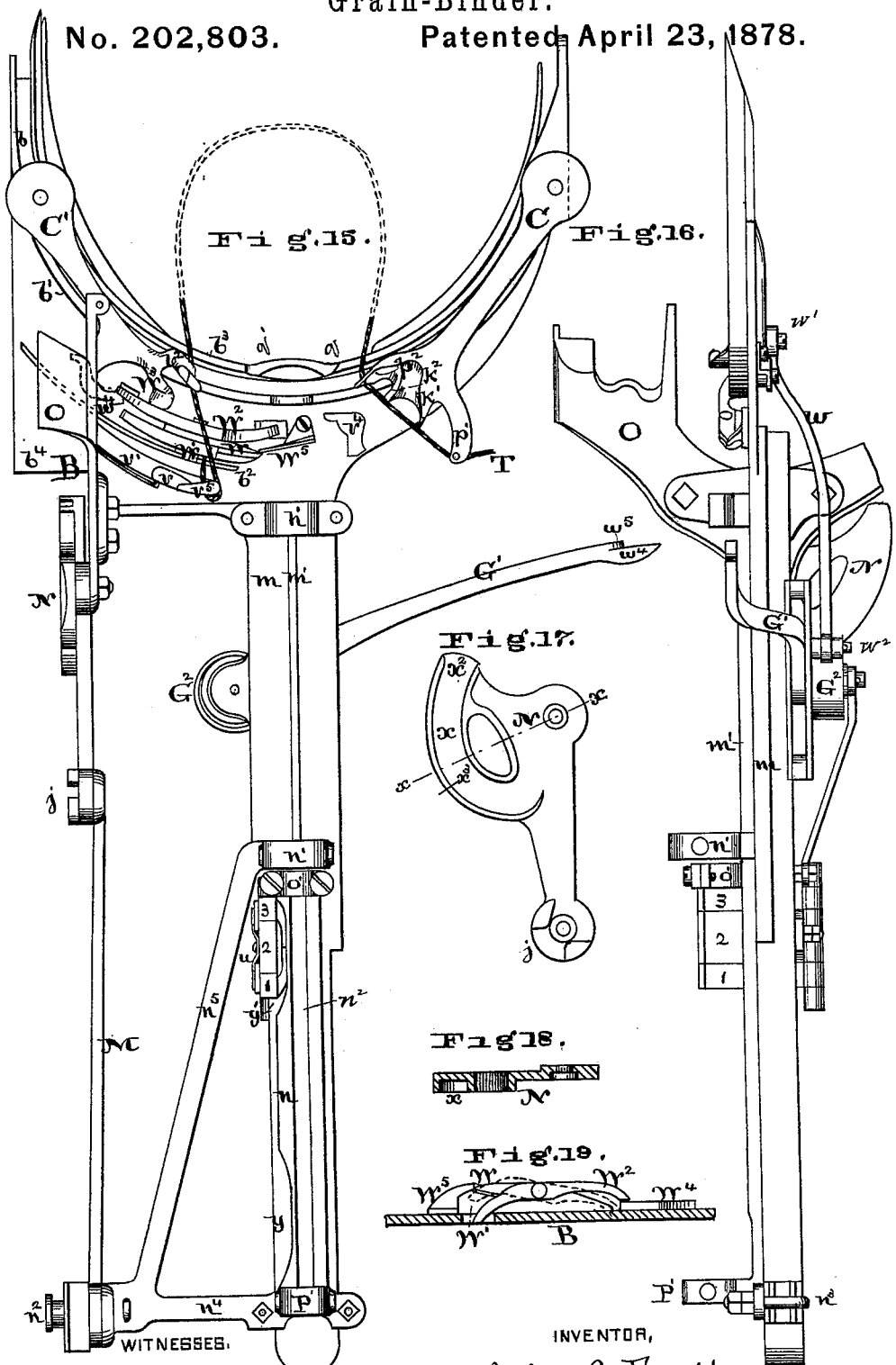

10 Sheets—Sheet 6.
N. B. FASSETT.
Grain-Binder.
No. 202,803. Patented April 23, 1878.
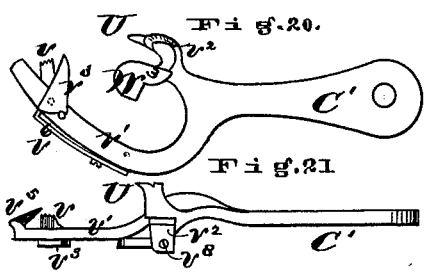
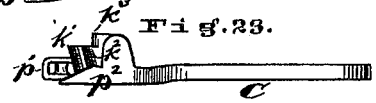
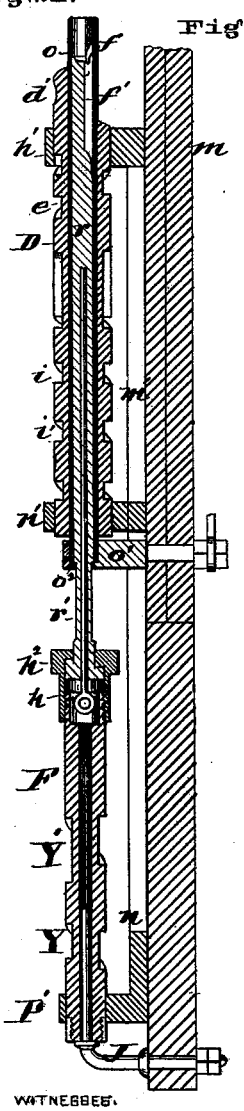
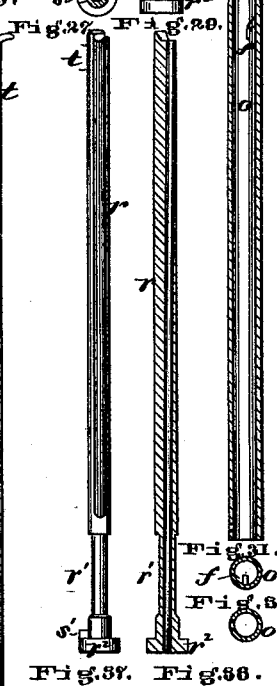
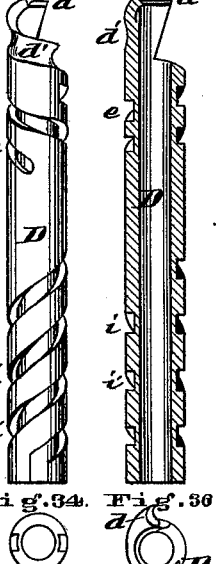
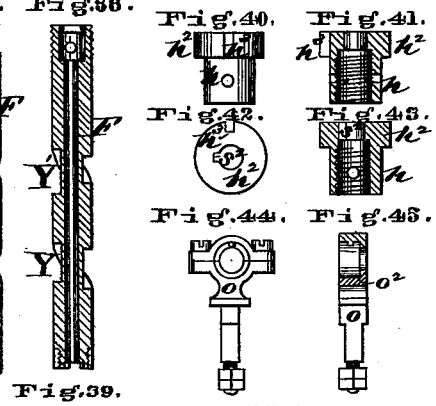
WITNESSES:
Saml. S. Boyd
Paul Bakewell
INVENTOR.
Nelson B. Fassett,
by Chas. D. Moody,
his atty.
N. PETERS, PHOTO-LITHOGRAPHER, WASHINGTON, D. C.

10 Sheets—Sheet 7.

N. B. FASSETT.
Grain-Binder.

No. 202,803. Patented April 23, 1878.

WITNESSES.
Saml. J. Boyd.
Paul Bakewell

INVENTOR.
Nelson B. Fassett,
by Chas. D. Moody,
his atty.

10 Sheets—Sheet 8.

N. B. FASSETT.
Grain-Binder.

No. 202,803. Patented April 23, 1878.

WITNESSES
Saml. S. Boyd
Paul Bakewell

INVENTOR.
Nelson B. Fassett,
by Chas. D. Moody.
his atty.

10 Sheets—Sheet 9.
N. B. FASSETT.
Grain-Binder.
No. 202,803. Patented April 23, 1878.
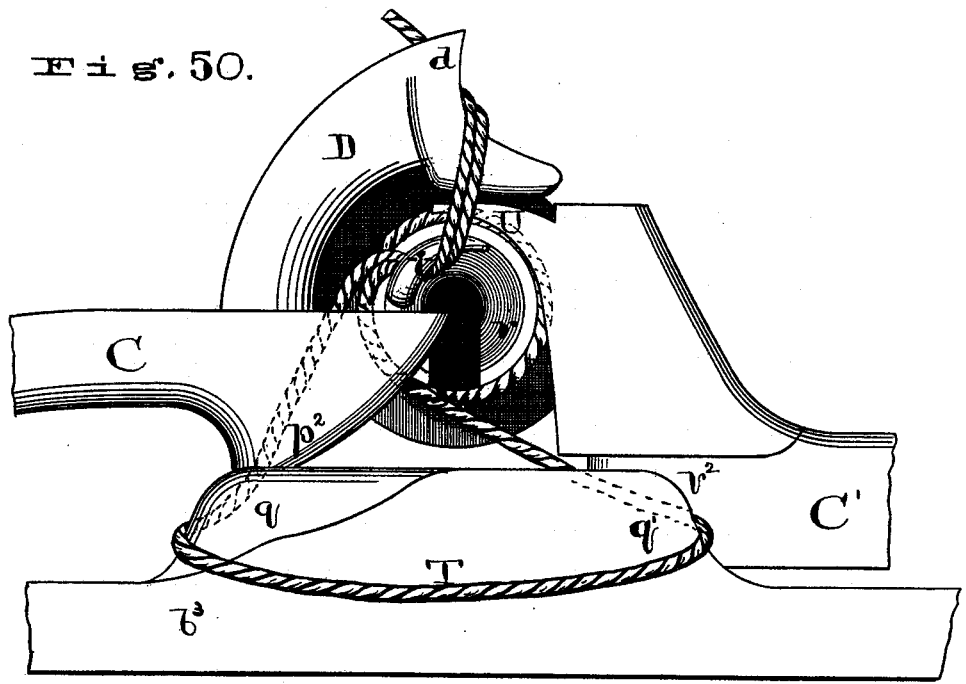
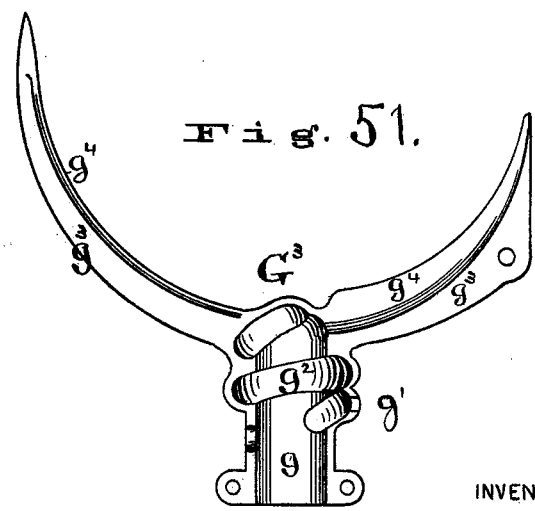
WITNESSES.
INVENTOR.
Nelson B. Fassett,
by Chas. D. Moody,
his atty.

UNITED STATES PATENT OFFICE.

NELSON B. FASSETT, OF ST. LOUIS, MISSOURI, ASSIGNOR OF ONE-HALF HIS RIGHT TO GILES F. FILLEY, OF SAME PLACE.

IMPROVEMENT IN GRAIN-BINDERS.

Specification forming part of Letters Patent No. 202,803, dated April 23, 1878; application filed December 2, 1876.

*To all whom it may concern:*

Be it known that I, NELSON B. FASSETT, of St. Louis, Missouri, have invented new and useful Improvements in Grain-Binder Attachments for Reapers, of which the following is a full, clear, and exact description, reference being had to the annexed drawings, making part of this specification, in which—

Figure 1:
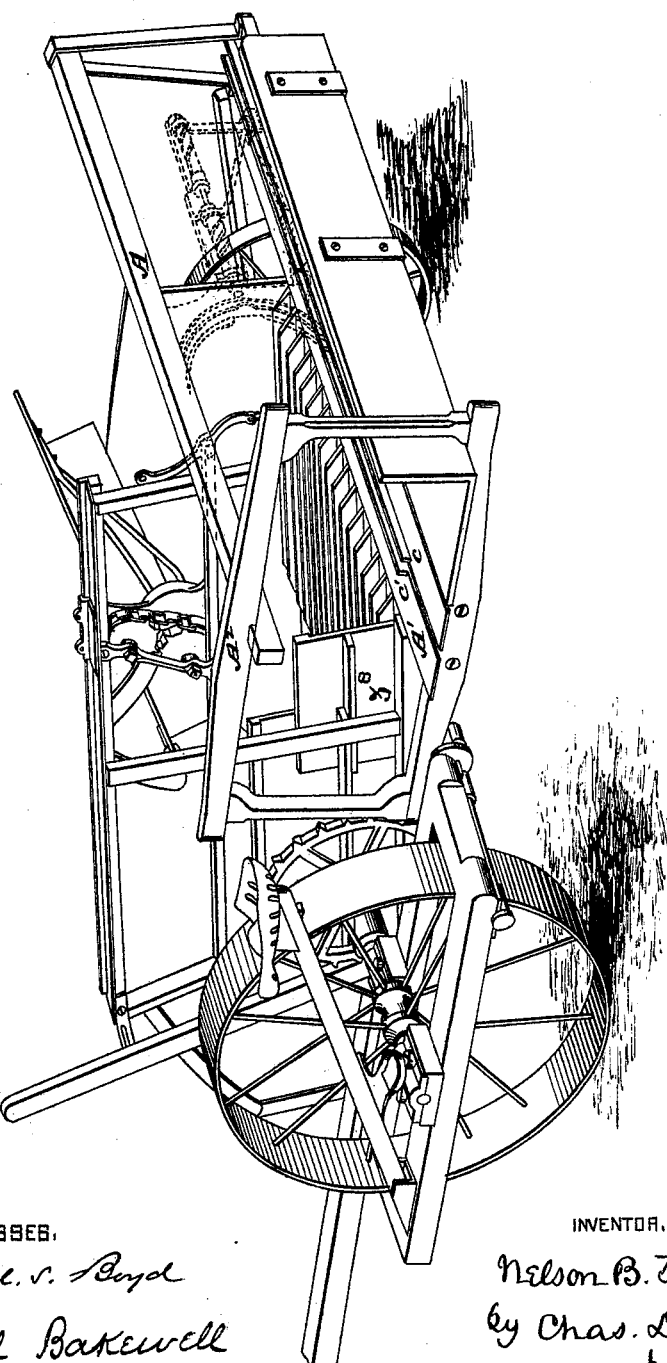
Figure 2:
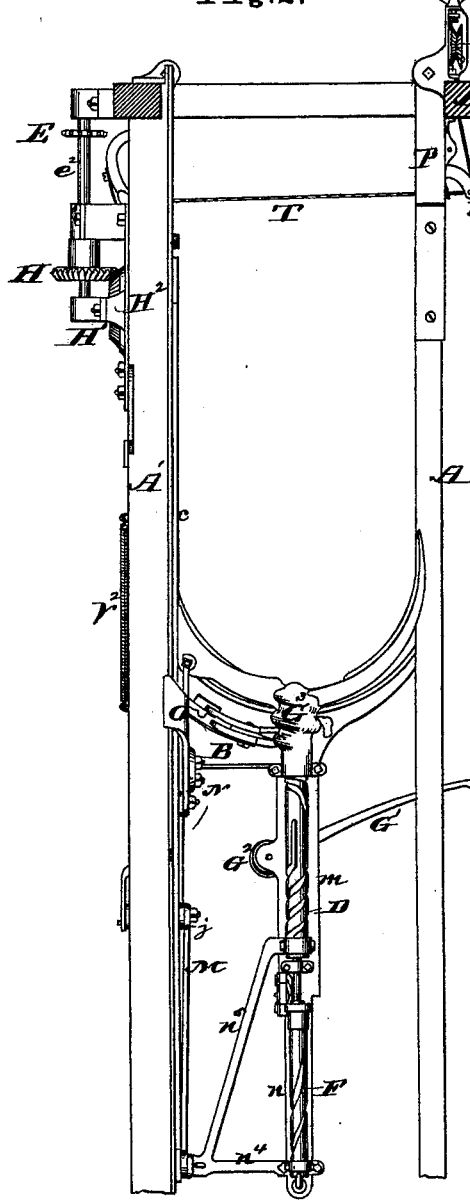
Figure 3:
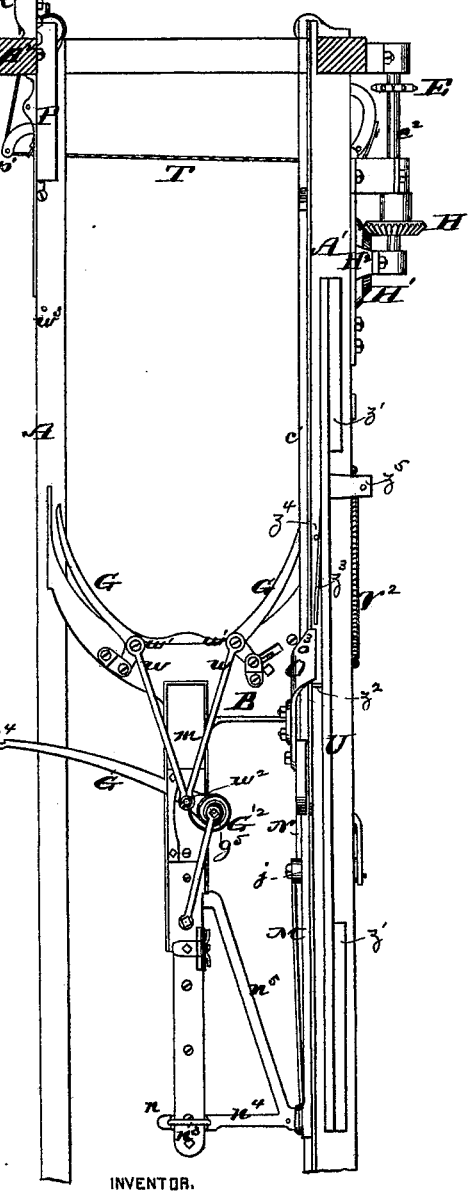
Figure 4:
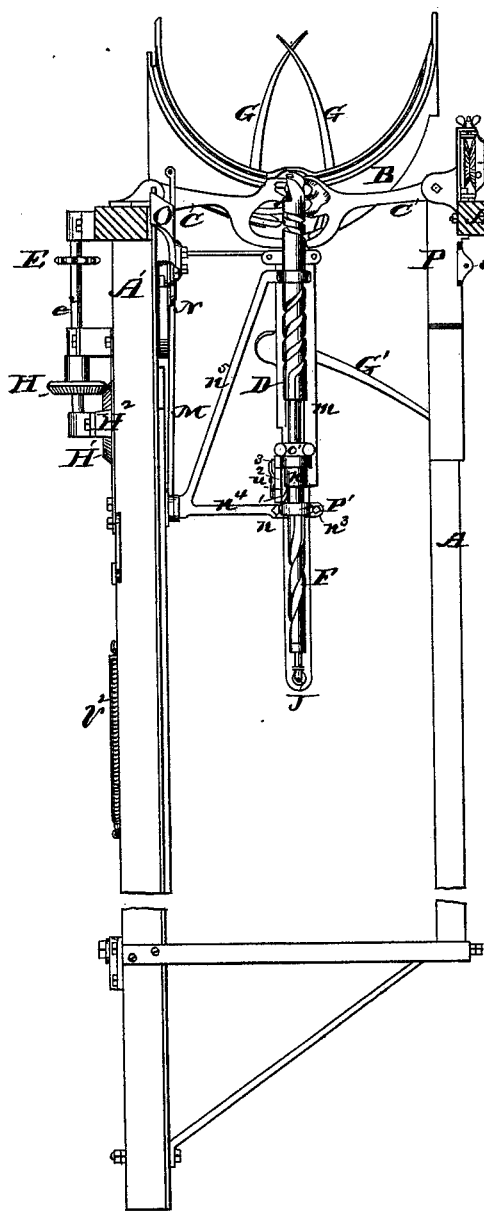
Figure 5:
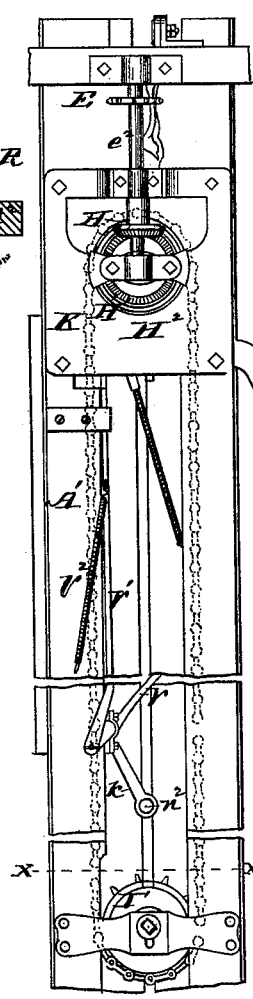
Figure 6:
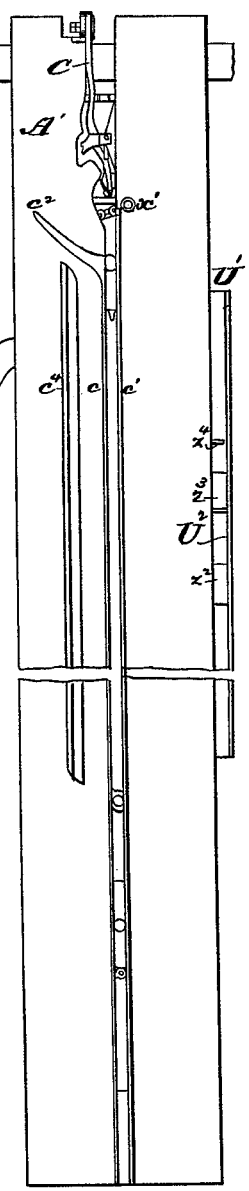
Figure 7:
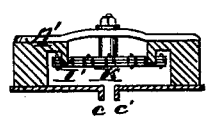
Figure 46:
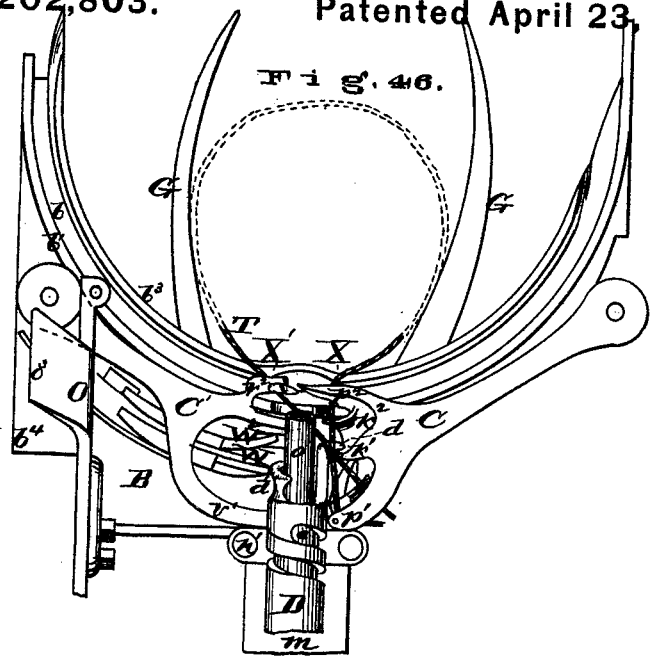
Figure 52:
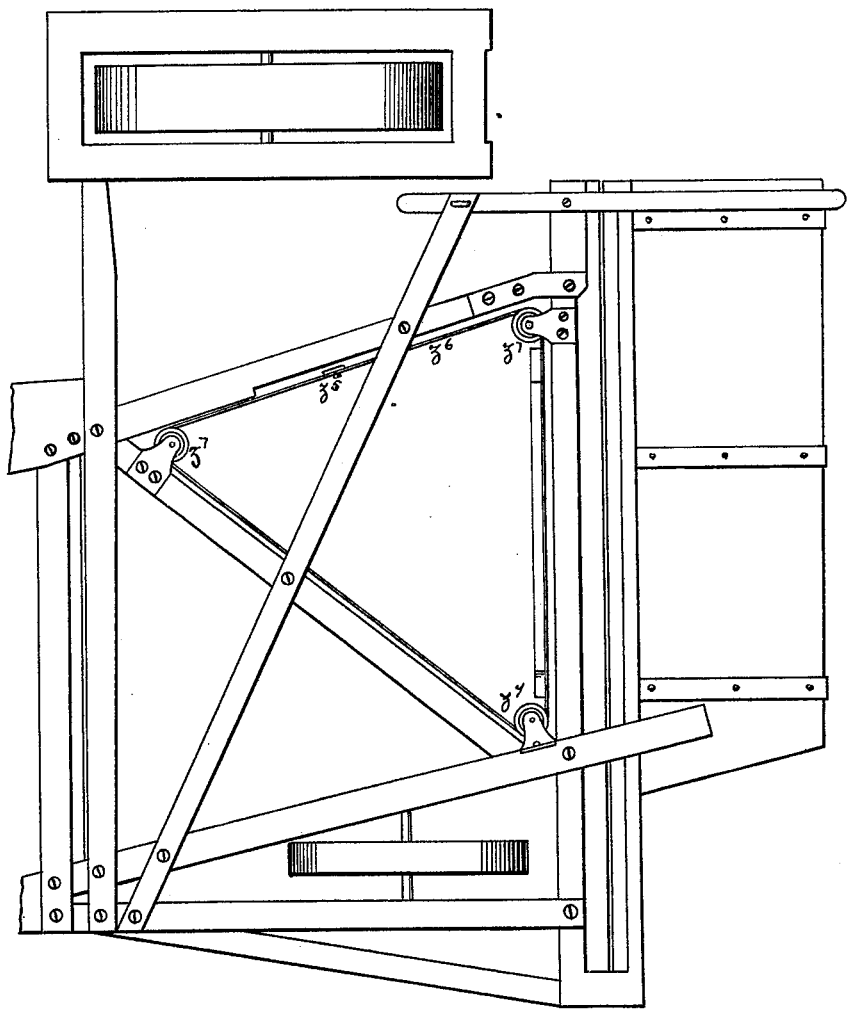

Figure 1 is a perspective of a reaper, showing the position of the binder in dotted lines; Fig. 2, a side elevation of the binder looking at the rear side; Fig. 3, a side elevation of the binder looking at the front side; Fig. 4, a side elevation of the binder, the sliding portion being at its extreme outward limit and the arms being closed together; Fig. 5, a bottom view of the binder; Fig. 6, a plan of the bed-plate; Fig. 7, a cross-section on the lines x x of Fig. 5; Fig. 8, a plan of the upper arm-plate, showing the tension device; Fig. 9, a longitudinal section of the same; Fig. 10, a plan of the wheel-basin and parts immediately therewith connected; Fig. 11, a cross-section on line x x of Fig. 10; Fig. 12, a bottom view of the sprocket-wheel at the outer end of the bed-plate; Fig. 13, a side elevation of the same; Fig. 14, a side elevation of the inclined plane; Fig. 15, a side elevation of the binder-head and the arms as in drawing the twine around the sheaf; Fig. 16, a plan of the same; Fig. 17, a bottom view of the oscillating cam; Fig. 18, a cross-section on the line x x of Fig. 17; Fig. 19, a section of a portion of the binder-head, showing the shears in elevation; Fig. 20, a side elevation of the lower arm; Fig. 21, an edge elevation of the same; Fig. 22, a side elevation of the upper arm; Fig. 23, an edge elevation of the same; Fig. 24, a longitudinal section of the knot-tying mechanism; Fig. 25, a view of the wire hook; Fig. 26, a cross-section of the spindle; Fig. 27, a side elevation of the spindle; Fig. 28, an elevation of the inner end of the spindle, showing the head; Fig. 29, a longitudinal end section of Fig. 27; Fig. 30, a longitudinal section of the tube around the spindle; Fig. 31, a cross-section of the tube, showing the releasing-hook; Fig. 32, another cross-section of the same, showing the hole in the tube to receive the pin of the intermediate stud, to keep the tube from turning or drawing out; Fig. 33, a side elevation of the cylinder D; Fig. 34, an elevation of the inner end of the same; Fig. 35, a longitudinal section of the same; Fig. 36, an elevation of the outer end of the same; Fig. 37, a side elevation of the inner spiral or shaft F; Fig. 38, a longitudinal section of the same; Fig. 39, an elevation of the outer end of the same; Fig. 40, a side elevation of the thimble-coupling; Fig 41, a longitudinal section of the same, taken through the slot in the rim of the coupling; Fig. 42, an outer end elevation of the coupling; Fig. 43, another longitudinal section of the coupling at right angles to that of Fig. 41; Fig. 44, a side elevation of the intermediate stud or bearing for the spindle; Fig. 45, a vertical section of the same; Fig. 46, an elevation of the forward end of the binder mechanism, the band completely encircling the sheaf and in position to be seized by the hook *a;* Fig. 47, another view of the same, the hook *d* having carried the string half around the spindle; Fig. 48, another view of the same, the string having been carried entirely around the spindle; Fig. 49, a view showing the form of the knot tied; Fig. 50, a front end elevation of the knot-tier, showing the hook *t* in position to seize the string from the hook *d* and draw it into the tube *o;* Fig. 51, a view of the cap; and Fig. 52 a bottom view of the reaper-platform and binder bed-plate.

The present invention relates to grain-binder attachments using twine for bands, and is an improvement upon the construction patented by me the 21st of May, 1872, and numbered 127,036, in which the twine is previously prepared by hand in lengths sufficient for a single sheaf only, which, by an attendant, are successively strung upon the binder as the sheaves are tied. The attendant also removes the sheaves from the binder.

The present construction is automatic. The twine is fed continuously from a bobbin, and strung in the binder as the sheaves are formed. Only that length of twine needed for a sheaf is drawn each time into the binder, and this, when tied around the sheaf, is then severed from the main cord. The sheaf is then discharged from the binder, while a new length of twine is being drawn in, and the entire operation is self-acting.

The invention has relation to the means used in communicating the driving power to the binding mechanism.

It also has relation to the construction for supporting the binding mechanism.

It also has reference to the means employed in regulating the movement of the knot-tier; also to the device for compressing the gavel as the string is being applied; to the means for enabling the twine to be fed continuously into the binder, for adjusting the length used on a sheaf to the size of the sheaf, and for separating it from the main cord; to the device for holding the string while it is being tied; to the means for regulating the tension.

It further relates to various improvements in the knot-tier proper.

For convenience, I will mainly describe the parts of the invention in connection with its operation.

Motion is communicated to the binder preferably by a chain (not shown) passing over a sprocket-wheel, E, Figs. 2, 3, and 4, on a shaft, $e^2$, arranged beneath the bed-plate $A^1$ of the binder, and longitudinally therewith, and there journaled in suitable bearings. On the inner end of the shaft is a bevel-wheel, H, that engages with another bevel-wheel, $H^1$, arranged horizontally at about the level of the bottom of the bed-plate $A^1$, and in what I term the "wheel-basin" $H^2$, Figs. 2, 3, 4, 10, and 11. Upon the top side of the wheel $H^1$ is a ratchet, $a$, for the purpose of connecting the wheel $H^1$ with a sprocket-wheel, I, Figs. 10 and 11, that is arranged horizontally above it, and upon the same journal as the wheel $H^1$, both being loose thereon.

The shaft $e^2$ and gear H are always in motion. The binder, however, works intermittingly, and to set it in motion the outer end of a trip-lever, Q, Figs. 5, 6, and 10, is pulled outward by any suitable mechanism connecting it with the reaper-rake. This lever is of a bell-crank shape, and pivoted at or near its elbow to the wheel-basin $H^2$. When the lever is tripped, its inner end encounters a projecting elbow, $l$, of an inclined plane, L, Figs. 10 and 14, that at one end is pivoted to the plate $H^2$, causing the end of the plane L to move away from the periphery of the ratchet $a$, and to dislodge a dog, $a^1$, Figs. 10, 11, 12, 13, that is connected with the sprocket-wheel I, and whose outer end has been resting upon the inclined plane.

The outer end of the dog, assisted by a spring, $a^2$, above it, drops into the revolving rachet $a$, connecting the wheels $H^1$ and I, and setting the latter in motion.

The wheel I and a similar sprocket-wheel, I', Fig. 5, similarly arranged at the inner end of the bed-plate $A^1$, serve to carry an endless chain, K, Fig. 5, that is stretched around them. A pitman, $k$, Fig. 5, at one end is pivoted to the chain K, moving with it, and at the other end is pivoted to the lower end $n^2$, Figs. 5 and 15, of the sliding bar $n$, Figs. 2, 3, 4, 24, and 15, that projects through the bed-plate.

A connecting-rod, $m$, Figs. 2, 3, 4, at its inner end is pivoted to the sliding bar $n$ just above the ways $c$ $c^1$ of the bed-plate. The rod is arranged longitudinally above the ways $c c^1$, and, extending outward, is, at its outer end, pivoted to an oscillating cam, N, Figs. 4, 15, 16, 17, and 18, at the end thereof. That part of the cam where the rod $m$ is attached is, on its under side, provided with two prongs, as shown in Figs. 17 and 15, to form a guide, $j$, Figs. 2, 3, and 15, to move on the flange of the way $c$, and direct the movement of the cam N, and also of the rod M.

The cam at the outer end is pivoted to a stool, O, Figs. 2, 3, 4, 15, 16, 46, 47, and 48, that embraces and slides upon the bed-plate $A^1$, and is rigidly attached to the binder-head B, and supporting it, being virtually an extension of the head.

As the chain K moves the rod M is pushed outward, causing the cam N, stool O, head B, and the knot-tier proper also to move outward. Until the guide $j$ reaches a switch, $c^2$, Fig. 6, the rate of the movement of the head B is uniform, and the same as that of the chain K. At this point the flange $c$ deviates to one side, forming what may be termed a switch, $c^2$.

The cam N, on its under side, has a groove, $x$, Figs. 17 and 18, of peculiar shape, hereinafter described. As the guide $c$ reaches the switch $c^2$ the rear wall of the inner end of the groove $x$ strikes a stop, $x^1$, Fig. 6, on the bed-plate $A^1$.

The guide $j$ moves out on the switch $c^2$, and the cam oscillates, being directed by the stop $x^1$, engaging in the groove $x$, and by the switch $c^2$. Two results follow: The head and all the parts rigidly connected thereto gradually cease to move outward on the bed-plate, and the knot-tying mechanism is gradually set in operation. The latter is sustained and immediately operated by the sliding bar $n$, that slides out and in upon another bar, $m$, called the "head-bar," that, in turn, is rigidly attached to the binder-head B at the middle thereof, and extending horizontally backward toward the inner end of the binder-frame. A stirrup, $n^3$, Figs. 4 and 16, connects the inner end of the bar $n$ with the bar $m$, and toward its forward end the bar $n$ is grooved to slide upon a feather, $m'$, Figs. 15 and 16, on the side of the head-bar $m$.

The sliding bar $n$ consists of the bar proper, $m$, and a standard, $n^4$, at the inner end thereof, to the lower end of which the pitman $k$ is attached, and higher up the connecting-rod, $m$. A brace, $n^5$, is also preferably extended from the lower end of the standard $n^4$ to the forward end of the bar proper.

Figure 47:
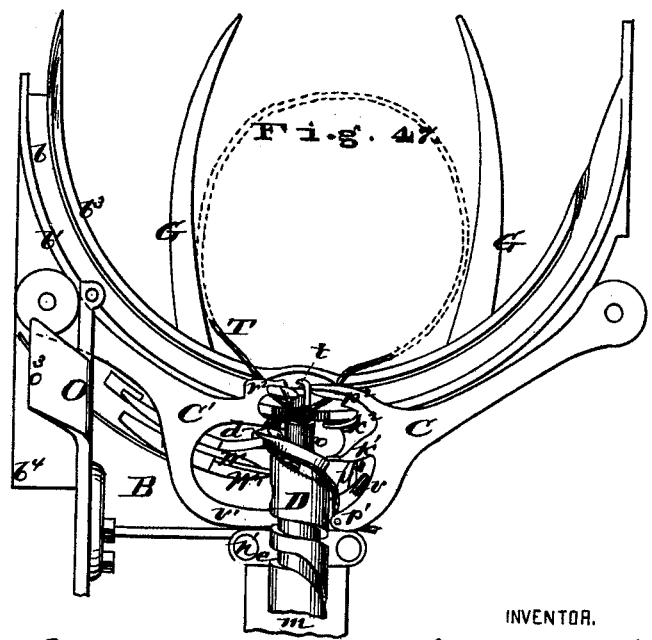
Figure 48:
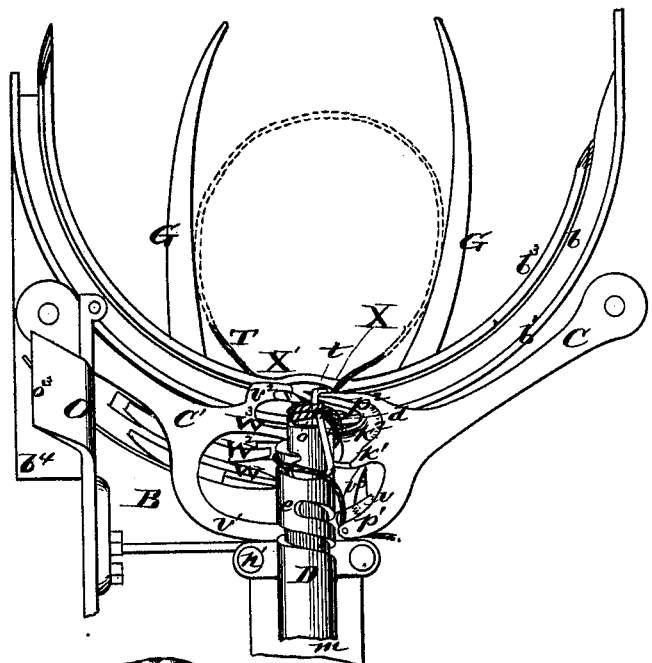
Figure 49:
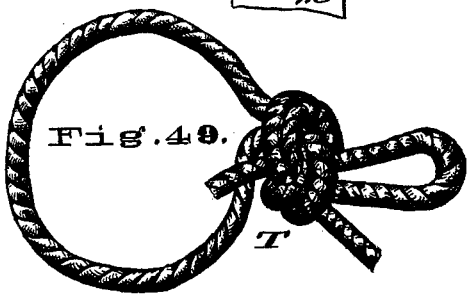

The binding-head is semicircular, as shown, and is provided with a circular rib, $b^1$, whose extreme outer ends are beveled, as shown in Figs. 46, 47, and 48. As the binding mechanism is moved outward, and before the guide $j$ has reached the switch $c^2$, these beveled points ride, respectively, upon and depress spring-catches Z Z, that are arranged, respectively, in the upper arm-plate P, Figs. 2, 3, 8, and 9, and the bed-plate $A^1$ of the binding-frame. This operation releases the arms C C', Figs. 15, 46, 47, and 48, that are pivoted, respectively, to the upper arm-plate P and bed-plate $A^1$, at the outer end thereof; and, in consequence of this, rib $b^1$, engaging in the space between the knuckle-prong $k^3$ and jaw-prong $p^2$, and the space between the shear-prong $w^3$ and jaw-prong $v^2$, respectively, of the arms C C', the latter are drawn inward toward each other, and as indicated in Fig. 15.

The string T, in the beginning, is carried from a bobbin (not shown in the drawing) around a tension-wheel, R, Figs. 8 and 9, (that is attached to the top of the outer end of the upper arm-plate P,) through the railing $A^2$ over a pulley, $s^3$, through the finger $p^1$ of the upper arm C, and thence through a latch, $v$, at the end of the latch-finger $v^1$ of the lower arm C', as shown in Figs. 2 and 3, and the binder-head B, in moving outward, presses the grain before it into a gavel that comes against the string. The effect is to cause the latter to assume the position shown in Fig. 15. As there seen, the string is around the sheaf, and the original end of the string passes from the latch $v$ against the jaw-prong $v^2$ of the lower arm C', and, at the other end, passes from the string-finger $p^1$ against the jaw-prong $p^2$ of the upper arm C. The binding mechanism is moved farther outward until the guide reaches the switch $c^2$, when the arms, the string, and the adjacent parts assume the position shown in Fig. 46. At this time, to prevent the expansive force of the sheaf from causing the string to slip, the string has, at two places, been caught and held in two jaws, respectively, X X'. The upper jaw (which, for convenience, I will call "X") is formed by the jaw-prong $p^2$ of the upper arm coming against the shoulder $q$ on the head B, and the lower jaw (called "X'") is formed by the jaw-prong $v^2$ of the lower arm coming against a shoulder, $q'$, on the head B. Just at this time, also, the tension of that portion of the string that is above the upper arm is slackened by reason of a projection, $c^3$, Fig. 9, on the upper end of the upper arm striking a shoulder, $p$, on the tension-reliever S, Fig. 9, that is, on a spring, $r^3$, operating to loosen the tension on that part of the spring above the jaw X. Also the extreme lower end of the string has been loosened in the latch $v$ by reason of the following: The latch $v$ is formed of two parts—a fixed hook, $v^5$, pointing downward, and a pivoted (and, preferably, corrugated) latch, $v$, closing against the hook. As the latch is moved upward and into the position referred to, a latch-lever, $v^3$, that is attached to and moves with the latch, encounters a stop, $v^4$, and is thereby deflected, so as to open the latch $v$ and let the string out. These two portions of the string—viz., those shown in Figs. 15 and 46, as stretched across the upper and lower arms, respectively—are therefore slackened sufficiently to be taken by the knot-tier, and they are the portions of the string from which the knot is formed. The knot-tying operation now begins. The guide $j$ moves out on the switch $c^2$, and the sliding bar $n$ is operating the knot-tier. The latter may be considered in two divisions—the noose-forming mechanism and the loop-forming mechanism. The former consists, mainly, of a spirally-grooved cylinder, D, having the grooves $i$, $i'$, and $e$, and hook $d$, and containing a tube, $o$, in which, in turn, is a spindle, $r$, carrying a wire hook, $t$. As the sliding bar is moved outward, the elbow $n^1$ causes the cylinder D to turn. The effect of this is to cause the hook $d$ to pass around and up between two knuckles, $k^1$ $k^2$, Fig. 46, of the upper arm C, and in so doing to catch the two portions of the string that are, respectively, stretched across the arms, as above described, and carry them into the position shown in Fig. 47, at which time the cylinder D will have made a full turn. As there shown, the string is wound nearly around the grooved cylinder end $d'$ and nearly around the spindle $r$, which now, by reason of the sliding bar $n$ and elbow $P^1$ acting on the shaft F, has been made to project from the tube $o$. The cylinder D and shaft F continuing to be rotated a half-turn more, the various parts are brought into the position shown in Fig. 48, at which time the double string will have been wound entirely around the spindle outside the tube $o$, the hook $d$ will have been moved forward around and up between the outer knuckle $k^2$ and the jaw-prong $p^2$ of the upper arm, the outer end of the spindle will have encountered the string-stop U of the jaw-prong of the lower arm, and the small wire hook $t$ will have been thrust out and turned upward into a position to catch (when the cylinder turns farther around) the string from the hook $d$. The cylinder D, continuing to be influenced by the sliding bar $n$, is now carried farther around, carrying the hook $d$ out beyond the hook $t$. The hook $t$ has meanwhile been prevented, by the thimble $h$ meeting the intermediate stud $o^1$, from being moved outward, but has been caused to rotate slightly, so as to bring it into position (shown in Fig. 50) to seize that part of the two strings stretched between the spindle $r$ and the hook $d$, and from which the loop is formed. The string-stop U keeps the string from slipping off the spindle until the latter is withdrawn. The noose is now made, and the loop is ready to be formed, and the loop-forming mechanism now comes more directly into use. It consists, mainly, of the spirally-grooved shaft F, having on its outer end a thimble-coupling, $h$, and holding in its outer end the wire hook $t$. The latter extends forward through the spindle $r$, lying diagonally therein, as shown in Fig. 29. The head of the spindle is inclosed in the thimble-coupling $h$, but the body of the spindle $r$ is held in the tube $o$. The chain K has now been moved around, so as to effect the return movement of the sliding bar $n$. The hook $t$ retreats into the tube $o$, drawing the strings from the hook $d$, and forming the loop of the knot, the tube $o$ pushes the noose part off the spindle $r$, and the knot is tied and the loop released from the hook $t$ by the hook $f$ in the tube $o$, and the head begins to move back. The knot has now been formed and detached from the knot-tier, but it is still part of the main string leading from the bobbin, and has to be separated therefrom. This is done by means of a pair of shears, W W$^1$, Figs. 19, 15, 46, 47, and 48. The latter consists of a movable blade, W, pivoted to and working with a fixed blade, W$^1$. A shear-lever, W$^2$, is attached to and moving with the movable blade. Previously, as the arms closed together, a shear-prong, W$^3$, of the lower arm, moving under the upper end of the lever W$^2$, had thereby thrown the movable blade outward, opening the shears, in which position they are as the knot is formed. The main string, as it is released after the knot is formed, falls under the hook $v^5$ of the lower arm, and, as that arm is drawn downward, the latch-lever $v^3$ encounters a rib, $b^2$, on the head, causing the latch $v$ to close upon the string, holding it firmly. As the arms continue to open, the latch draws that part of the string that is between it and the knot down into the shears. The shear-prong W$^3$ now comes under the lower end of the shear-lever, throwing that end outward, and closing the shears and cutting the string. The latch still holds firmly what is now the new end of the string, and, as the arms open out into their original position, the string is strung thereon, as first above described. As the lower arm opens out, the shear-prong W$^3$, after passing the lever W$^2$, strikes the lower end of a shear-dog, W$^4$, that is, at or near its center, pivoted to the head B, and in so doing throws the upper end of the dog under the now raised lower end of the shear-lever. This blocks the latter in that position, and thus keeping the shears shut until the dog is dislodged by the same prong encountering its upper end, when the arm C' is again closed. The object of this dog is to prevent the string, in riding upon the lower end of the shear-lever W$^2$, from pressing that end of the shear-lever down so as to be hit by the shear-prong when the arm C' again closes. The head is now drawn inward to the inner end of the binder-frame. In this inward movement a stop, $b^4$, Fig. 15, on the under edge of the binder-head, encounters what I term the "plunger-crank" V, Fig. 5, that is journaled in the bed-plate. This operates, in turn, to thrust the front end of the plunger-rod V$^1$ against the inclined plane L. Then, as the sprocket-wheel I turns, it causes the dog $a^1$ to ride upon the inclined plane L. This raises the dog $a^1$ out of the ratchet $a$ below, and disengages the wheel L from the wheel H$^1$, and thus arrests the operation of the binding mechanism just when the head B is at its extreme backward limit, when it is ready to receive another gavel.

In starting the binder, the trip-lever Q, as before described, is pulled, so as to draw the inclined frame L backward and dislodge the dog $a^1$. In doing this, however, the inner end of the trip-lever Q has encountered a bevel on the under side of the forward end of the plunger-rod, lifting the latter and disengaging it from a stop, $l'$, on the inclined plane, allowing the latter to be drawn back, as described. The binder-head is immediately set in motion, and, as it passes the plunger-crank V, the plunger-rod V$^1$ is, by means of a spring, V$^2$, made to draw back, and, by means of another spring (not shown) above it, forced down off the stop $l'$ on the inclined plane L and onto the inner end of the trip-lever Q, where it remains until the head B returns and again encounters the plunger-crank.

Several details will now be more fully decribed.

The shaft F has in its periphery two similar grooves, Y Y', which, beginning near its inner end and on opposite sides, wind forward and around the shaft, making one turn around it, and thence extending longitudinally forward a short distance to its forward end. The grooves are wider at the forward end, Fig. 37, of their spiral portions, and I preferably make the spirals to widen gradually and steadily from their inner to their outer termini.

The aim and effect of this widening is to enable the cylinder D, as the knot-tier returns and the loop is being formed, to rotate backward slightly in advance of the hook $t$, and thus prevent any undue strain upon the string by the hook $t$. The shaft F passes through an elbow, P', attached to the inner end of the sliding bar $n$, and having two pins engaging, respectively, in the grooves Y Y', by means of which the movements of the shaft are caused.

The thimble-coupling $h$ at the outer end of the shaft F has a rim, $h^2$, projecting uniformly all around the body of the thimble, and having a notch, $h^3$, into which the stops 1 2 3, Fig. 4, successively fall as the depressions $y$ $y'$, Fig. 15, in the sliding bar, come opposite the stops. While thus engaged the rotation of the shaft F is prevented.

The stops 1 2 3 are attached to the under side of the head-bar $m$, and a U-shaped spring, $u$, fastened at its base to the body of the fixed stop 2, operates to depress the stops 1 and 3 into the notch $h^3$.

The sliding bar $n$ is slotted longitudinally at $n^2$, Fig. 15, to enable it to pass the intermediate stud $o^1$ that projects from the bar $m$ to act as a bearing for the spindle $r$, and also to sustain the inner end of the tube $o$. In the spindle $r$, near its head, is a recess, $r^1$, Figs. 27, 29, 24. The shoulder at the inner end of the recess, in the outward movement of the spindle, comes against the outside of the intermediate stud $o^1$, and the spindle is thus kept from going too far into the tube $o$, and the shoulder at the outward end of the recess, in the return of the spindle, comes against the stud at $o^2$, and the spindle is thus kept from drawing too far out of the tube.

The feather $s^1$, Figs. 27, 28, on the spindle-head, and that engages in the slot $s^2$, Figs. 42, 43, is made tapering. As the shaft F is drawn back by the sliding bar it encounters the rear-line stud J, Fig. 4. At the same time the rim $h^2$ on the thimble has passed the stop 2. The shaft is thus locked longitudinally, and can only rotate, in doing which the taper on the feather $s^1$ inclines the spindle to move slightly inward into the thimble-coupling $h$. The effect of this is to cause the outer end of the spindle to recede slightly from the hook proper $t$, and allow the string to be more readily unhooked from it by the hook $f$. Now, the tendency of the string, as the knot is being tied, is to draw the spindle and shaft F outward during the rotation of the latter, after it has been withdrawn into the position last described. But owing to the rim $h^2$ projecting uniformly all around the body of the thimble, and encountering the stop 2, the shaft is prevented from moving longitudinally outward at all points of its rotation.

The cylinder D passes through the elbow $n^1$ of the sliding bar $n$ and the cap-stud $h^1$ of the bar $m$. The outer spiral groove $e$ commences on the side next the head, and runs nearly at right angles around the cylinder, making a little toward its inner end, and after passing about once and one-half around, strikes off at at an angle of about forty degrees, as shown in Fig. 33.

The inner spiral grooves $i$ and $i'$ are similar, and, commencing at the inner end of the cylinder, they wind outward about once and three-fourths around it, and thence longitudinally outward, as shown in Fig. 33. A pin, $e^1$, of the lug $h^1$ engages in the groove $e$, and two pins of the elbow $n^1$ engage in the grooves $i\, i'$.

The hook $d$, at the outer end of the cylinder D, points outward at nearly right angles therefrom. A groove $d'$, Fig. 33, extends around the cylinder, just inside and parallel with the line of the extension of the back of the hook. That portion of the string that the hook $d$ carries around the cylinder D is drawn into this groove, and thus kept from slipping off the cylinder as it is being wound around it. The stop $v^4$, Fig. 45, is arranged so that its outer face, when the arm C is closed, operates to press the knuckle-prong $k^3$ outward, and thus co-operates in clamping the string in the upper jaw X. An additional wearing-surface, in connection with the operation of the parts forming the jaw X, is by this means obtained, and the construction made more durable. $G^3$, Fig. 51, represents a cap that covers the outer portion of the binding mechanism. It is attached to the cap-stud $h^1$. Its shank $g$ is notched at $g^1$ to admit the point of the movable blade of the shear when opened, and the string is thus prevented from passing down outside of the movable blade. The shank is also corrugated at $g^2$, so that the hook $d$, in carrying the string around, follows closely these corrugations, and the short end of the string is thus prevented from slipping off the hook.

The outer part of the cap is semicircular in form, and consists of two sets of flanges, one set in a longitudinal direction, and the other in a transverse direction. The longitudinal flanges $g^3\, g^3$ serve to keep the jaw-prongs against the head at the time of the clamping the string in the jaws X and X′, and the transverse flanges $g^4\, g^4$, by means of their inner edges, to depress the two parts, respectively, of the string into the jaws X X′. The two horns of the cap also keep the straw out of the knot-tier.

$W^5$, Figs. 19 and 15, represents a fender arranged upon the head at the upper end of the fixed blade, to prevent any loose part of the string from getting behind the shears. The devices for regulating the tension of the main cord are shown in Figs. 8 and 9. An upper and lower button, riveted together, form a tension-wheel, R, that is journaled to an extension, $p^3$ of the upper arm-plate P. A spring, $r^3$, encircles the wheel R, its outer end being adjustable by a set-screw on an ear setting up from the upper side of the upper arm-plate, and its inner end being hung on a stud, $s$, projecting from the upper side of the tension-rel ever S, above mentioned. The spring, towards its inner end and on its outer side, carries a shoe, $r^4$, which is pressed by the spring against the tension-wheel, causing a tension, save when the spring $r^3$ is, by means of the arm C and tension-reliever, drawn away from the tension-wheel.

A spring-washer, $r^5$, on the upper button serves to press the tension-wheel down sufficiently to prevent it from turning loosely upon its center.

In using the tension the string is passed through a hole, $p^4$, in the extension of the upper arm-plate, and thence under a wire hold-down, $r^6$, that is attached to the spring $r^3$ to keep the string from slipping upward off the upper button, and thence, after passing suitably around the tension-wheel R, it passes through the rail $A^2$, over the pulley $s^3$, to and through the string-finger $p^1$ of the upper arm, and thence into the latch of the lower arm.

To relieve the strain upon the string as it is applied to the gavel, it is desirable that the latter be compressed meanwhile by an auxiliary device called the "compressors," Figs. 16 and 46. This device consists, mainly, of two similar compressing arms or tines, G G, of a bell-crank shape, pivoted at their inner ends to the head B. Two rods, $w$ $w$, at their outer ends are pivoted, respectively, to the tines G G, at their angles $w^1$ $w^1$. The inner ends of the rods are pivoted at $w^2$ to a spring-lever, $G^1$, that turns on a bracket attached to the head-bar. A coil-spring, $G^2$, surrounds the hub $g^5$ of the lever, its inner end being attached to the hub, and its outer end to the lever, as shown. The lever $G^1$ extends upward far enough to encounter a pin or stop, $w^3$, on the upper railing of the binder-frame. As the head B is moved outward the lever $G^1$ encounters the stop $w^3$, the effect of which is, as the head continues to move outward, to close the tines and compress the spring. The stop is arranged to effect the closing of the tines slightly in advance of the drawing of the string around the gavel. The tines remain closed around the gavel until the knot is tied. The sheaf should now be promptly released from the compressors. To this end, the pin $w^3$ is set slantingly in the railing, and the upper end of the lever is made with an offset, $w^4$. This offset at, $w^5$, is beveled. As the binder-head is withdrawn the lever moves upon the pin until the offset, coming against the slanting pin, throws the lever entirely off the pin. The sheaf then, assisted by the spring $G^2$, acts to throw the lever sharply forward and suddenly open the compressing-arms. In this way the sheaf is instantly released. The groove $x$, in the under side of the oscillating cam N, is circular from the end $x^2$ to the point $x^3$, the center of the circle being the pivot of the cam. From the point $x^3$ to the outer end of the groove the curve is of a varying radius, as shown.

The bed-plate $A^1$ is made, preferably, of two bars arranged side by side, and having a space between them, in which the lower end of the head and sliding bar move. On the inner edges of the upper side of the bars are flanges $c$ $c^1$, forming ways for the bevel to slide on. The bed-plate is further provided with a rib, $c^4$, arranged longitudinally at the side of the way. It keeps the straw from getting under the cap-prong below and into the knot-tier.

Instead of pivoting the oscillating cam N to the stool O, it may, if preferred, be pivoted directly to the head proper B.

In order that the pitman $k$ and chain K may always move evenly with the head B, the number of links in the chain must be a multiple of the number of the sprockets in the wheels I $I^1$.

$U^1$, Figs. 3 and 6, represents a trough arranged upon the side of the bed-plate $A^1$. A slide, $U^2$, is made to move in it, forward and back, between the stops $z^1$ $z^1$, in the following manner: The slide is provided on its top with a fixed stop, $z^2$, and a spring-stop, $z^3$, the free end of the latter being toward the former, and about as far from it as the length of the lip $o^3$ of the stool O, and the parts are so arranged that the lip comes between the stops as the head B is at the inner end of the binder frame. As the head moves outward, the lip, encountering the stop $z^3$, pushes the slide forward until the stop $z^3$ has been brought under a pin, $z^4$, in the side of the bed-plate, and thereby depressed sufficiently for the lip to pass over it. The head continues to move outward, but the slide remains stationary until the head has returned and the lip $o^3$ has been brought against the inner stop $z^2$, when the slide is moved inward again to its original position. On the under side of the slide is another stop, $z^5$, connected with a belt, $z^6$, that is carried around pulleys $z^7$ $z^7$ $z^7$, Fig. 52, and that is connected with another slide, $z^8$, that forms part of the slide of the platform of the reaper.

As the slide $U^2$ is moved forward and back the belt $z^6$ is correspondingly moved. The aim and effect are to provide means for enlarging the opening at the side of the reaper as the binder moves outward, and thus furnish sufficient room for the discharge of the gavel.

In the jaw-prong $v^2$ of the lower arm $C'$ is a set-screw, $v^8$. As the parts composing the lower jaw $X^1$ gradually wear away, this screw can be set out accordingly, and the jaw made sufficiently close.

What I claim is—

1. The shears W $W^1$, shear-lever $W^2$, and shear-prong $W^3$, combined and operating substantially as described and shown.

2. The combination of the shear-prong $W^3$, the shear-lever $W^2$, and the shear-dog $W^4$, with a suitable device for operating the shear-prong, substantially as described.

3. The movable blade W, shear-lever $W^2$, shear-prong $W^3$, and shear-dog $W^4$, combined and operating substantially as shown and described.

4. The combination of the fixed blade $W^1$ and the fender $W^5$, substantially as and for the purpose set forth.

5. The combination of the lower arm $C'$, latch-finger $v^1$, hook $v^5$, and shears W $W^1$, substantially as described.

6. The arm $C'$, having the latch-finger $v^1$, provided with the lever $v^3$, the spring $v^6$, hook $v^5$, and latch $v$, substantially as shown and described.

7. The combination of the arm $C'$, latch-finger $v^1$, latch $v$, latch-lever $v^3$, and stop $v^4$, substantially as shown and described.

8. The latch-finger $v^1$, provided with the latch $v$ and hook $v^5$, substantially as and for the purpose set forth.

9. The combination of the arm $C'$, latch-finger $v^1$, and hook $v^5$, to draw the string into the shears, substantially as shown, and for the purpose set forth.

10. The latch-finger $v^1$, provided with the latch-lever $v^3$ and spring $v^6$, substantially as shown and described.

11. The combination of the arm $C'$, latch-finger $v^1$, latch-lever $v^3$, and rib $b^2$, substantially as set forth and described.

12. The combination of the hook $v^5$, finger $v^1$, string T, and upper arm-finger $p^1$, substantially as shown, and for the purpose set forth.

13. The combination of the string T, latch-finger $v^1$, latch $v$, hook $v^5$, lever $v^3$, and stop $v^4$, substantially as set forth and described.

14. The combination of the jaw $X^1$, string T, finger $v^1$, latch $v$, hook $v^5$, stop $v^4$, and hook $d$, substantially as set forth and described.

15. The combination of the jaws $X X^1$, string T, arms C and C′, and hook $d$, substantially as shown and described.

16. The cap $G^3$, having the corrugations $g^2$, to receive the hook $d$, substantially as shown and described.

17. The upper arm C, having the knuckles $k^1$ $k^2$, to depress the strings beyond the line of the finger $p^1$ and jaw-prong $p^2$, and within the field of the hook $d$, substantially as set forth and described.

18. The combination of the knuckle-prong $k^3$ and the stop $v^4$, substantially as set forth and described.

19. The combination of the arm C, having the jaw-prong $p^2$ and knuckle-prong $k^3$, and the rib $b^1$, substantially as set forth and described.

20. The combination of the arm C, jaw-prong $p^2$, jaw-flange $q$, and rib $b^1$, substantially as shown and described.

21. The combination of the arm C′, jaw-prong $v^2$, jaw-flange $q'$, and rib $b^1$, substantially as shown and set forth.

22. The cylinder D, having the hook $d$ and the groove $d'$, substantially as shown and described.

23. The combination of the arm C, jaw-prong $p^2$, string-finger $p^1$, and hook $d$, substantially as set forth and described.

24. The combination of the arm C′, having the jaw-prong $v^2$, latch $v$, and hook $v^5$, and the arm C, having the jaw-prong $p^2$, and string-finger $p^1$, substantially as set forth and described.

25. The combination of the arm C, projection $c^3$, tension-reliever S, and spring $r^3$, substantially as set forth and described.

26. The combination of the arm C, projection $c^3$, and tension-reliever S, substantially as described.

27. The combination of the tension-wheel R, spring $r^3$, shoe $r^4$, and tension-reliever S, substantially as shown and described.

28. The hold-down $r^6$, spring $r^3$, and string T, combined and operating substantially as shown and described.

29. The combination of the tension R, spring $r^3$, and arm C, substantially as set forth and described.

30. The tines G G and rods $w$ $w$, combined and operating substantially as set forth and described.

31. The combination of the tines G G, rods $w$ $w$, and coil-spring $G^2$, substantially as set forth and described.

32. The combination of the tines G G, rods $w$ $w$, lever $G^1$, bar $m$, pin $w^3$, and spring $G^2$, substantially as shown and described.

33. The combination of the tines G G, rods $w$ $w$, lever $G^1$, having beveled offset $w^4$, pin $w^3$, bar $m$, and spring $G^2$, substantially as set forth and described.

34. The shaft F, having the grooves Y Y′, widened at their outer ends, for the purpose set forth.

35. The combination of the shaft F, having the grooves Y Y′, widened at their outer ends, and the elbow P′, substantially as shown and described.

36. The thimble $h$, provided with the circular rim $h^2$, in combination with the stop 2, substantially as set forth and described.

37. The beveled feather $s^1$ on the spindle $r$, in combination with the thimble $h$, substantially as and for the purpose set forth.

38. The combination of the spindle $r$, having the recess $r^1$ and the intermediate stud $o^1$, substantially as set forth and described.

39. The combination of the binder-head B, sliding bar $n$, pitman $k$, and endless chain K, substantially as set forth and described.

40. The combination of the sliding bar $n$, rod M, oscillating cam N, and stop $x^1$, substantially as shown and described.

41. The combination of the connecting-rod M, way $c$, switch $c^2$, guide $j$, and oscillating cam N, substantially as shown and described.

42. The combination of the grooved cam N, stop $x^1$, and stool O, substantially as set forth and described.

43. The combination of the head B, stool O, cam N, and rod M, substantially as set forth and described.

44. The combination of the head B, stool O, grooved oscillating cam N, and stop $x^1$, substantially as set forth and described.

45. The combination of the cam N, guide $j$, switch $c^2$, rod M, and stop $x^1$, substantially as set forth and described.

46. The combination of the grooved oscillating cam N and the stop $x^1$, substantially as set forth and described.

47. The combination of the oscillating cam N, guide $j$, and switch $c^2$, substantially as shown and described.

48. The combination of the head B, stool O, and bed-plate $A^1$, substantially as set forth and described.

49. The combination of the cap $G^3$, and the rib $c^4$ on the bed-plate $A^1$, substantially as set forth and described.

50. The combination of the head B, having the stop $b^4$, the plunger-crank V, plunger-rod $V^1$, inclined plane L, and spring $V^2$, substantially as shown and described.

51. The combination of the trip-lever Q, basin-plate $H^2$, inclined plane L, ratchet $a$, and hook $l$, substantially as set forth and described.

52. The combination of the ratchet bevel-wheel $H^1$, wheel I, dog $a^1$, and inclined plane L, substantially as set forth and described.

53. The combination of the plunger-rod $V^1$, plunger-crank V, head-stop $b^4$, inclined plane L, and dog $a^1$, substantially as shown and described.

54. The combination of the rod $V^1$, inclined plane L, and dog $a^1$, substantially as shown and described.

55. The combination of the trip-lever Q, ratchet $a$, inclined plane L, having the hook $l$, and the rod $V^1$, having the beveled forward end, substantially as shown and described.

56. The combination of the pivoted inclined plane L and the pivoted dog $a^1$, substantially as set forth and described.

57. The combination of the jaw-prong $v^2$ and the compensating set-screw $v^8$, substantially as and for the purpose set forth.

NELSON B. FASSETT.

Witnesses:
 SAML. S. BOYD,
 PAUL BAKEWELL.